Sept. 15, 1959  F. N. GILLETTE ET AL  2,904,694
EXPOSURE CONTROL SYSTEM
Filed Jan. 10, 1958
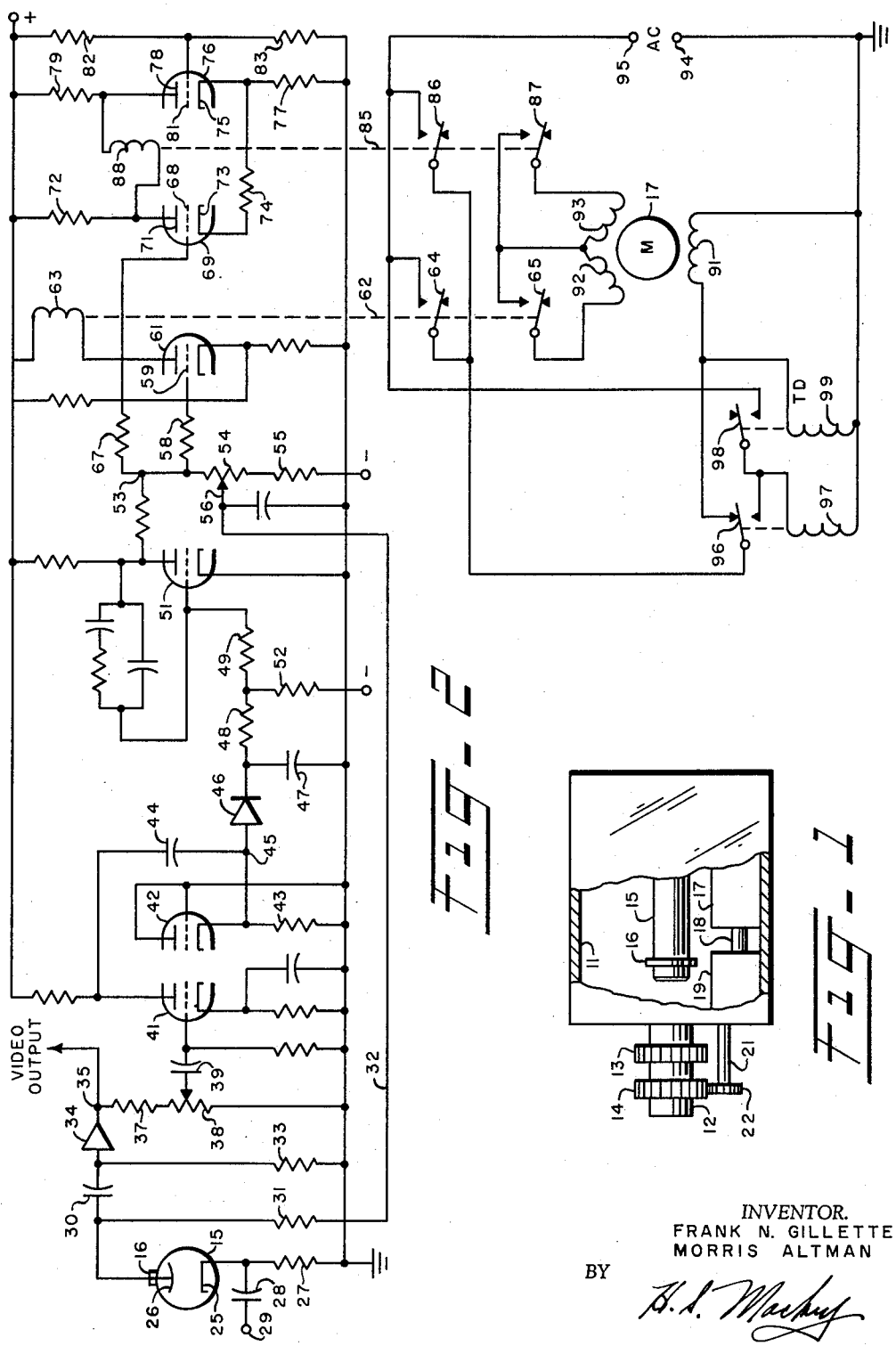
INVENTOR.
FRANK N. GILLETTE
MORRIS ALTMAN
BY
ATTORNEY.

United States Patent Office 2,904,694
Patented Sept. 15, 1959

2,904,694

EXPOSURE CONTROL SYSTEM

Frank N. Gillette, Pleasantville, and Morris Altman, Putnam Valley, N.Y., assignors to General Precision Laboratory Incorporated, a corporation of New York Application January 10, 1958, Serial No. 708,261

7 Claims. (Cl. 250—205)

This invention relates generally to television cameras and particularly to apparatus for automatically compensating for changes in the average brightness of the scene being viewed.

Television cameras are required to transmit acceptable pictures of scenes having a wide variation in intensity of illumination ranging from bright outdoor sunshine to comparatively low level artificial light. Obviously provision must be made for suitable adjustments to enable the camera to accommodate such variations and it is desirable that the adjustments be made automatically.

Two general approaches to the problem have been made in the past. First, camera lenses are normally provided with an adjustable iris diaphragm which allows the opening to be varied over a considerable range such as from $f/1.5$ to $f/22$ which corresponds to a range of 200 to one in light intensity and it has been proposed to provide a servomechanism for adjusting the iris either in response to incident light as measured by a photo cell or in response to the magnitude of the video signal output. Second, many light sensitive television pick-up tubes deliver an output signal the magnitude of which can be controlled by adjusting the potential of one of the electrodes and it has therefore been proposed to vary this potential automatically in response to the magnitude of the output signal. Each arrangement has its limitations. The iris adjustment is of course limited by the range of openings provided but what is far more important is that the iris mechanism is not ordinarily designed for continuous operation and has an unreasonably short useful life when operated practically continuously as it would be in the above proposed system. The electrode potential adjustment is seriously limited by the small range of light intensity compensation obtainable, usually on the order of twenty or thirty to one.

It is an object of the present invention to compensate for variations in the intensity of light incident upon a television camera.

Another object is to provide apparatus for automatically adjusting a television camera for optimum operation despite variations in the average brightness of the scene being viewed.

Another object is to control automatically the magnitude of the video output signal of a television camera.

Another object is to maintain both the potential of a control electrode of a television camera tube and the iris opening near their respective optimum values for the brightness of the scene being viewed.

Another object is to provide full range automatic compensation for scene illumination variations while avoiding excessive wear on moving parts.

Briefly stated, one embodiment of the invention comprises an electronic circuit including a high gain amplifier which generates a unidirectional control voltage the magnitude of which varies with the magnitude of the video output signal. This control voltage is used to bias an electrode of the camera tube in such a sense as to tend to maintain the output signal constant. The same control voltage operates through another circuit to control a motor mechanically connected to the iris. When the control voltage reaches a first limiting value the motor starts to open the iris and continues to open it until the control voltage is returned to a median value. When the control voltage reaches a second limiting value (in the opposite direction from the first) the motor closes the iris until the control voltage returns to a median value.

For a clearer understanding of the invention reference may be made to the following detailed description and the accompanying drawing, in which:

Figure 1 is an elevation view of a housing for and some of the elements of a television camera employing the present invention; and Figure 2 is a schematic diagram of the electric circuit.

Referring first to Figure 1, there is shown a housing 11 within and upon which the elements making up a television camera may be mounted. Mounted on the front wall of the housing 11 is a lens 12 equipped with focussing and iris adjusting gears 13 and 14 respectively. Within the housing is a conventional television camera tube 15 containing a light sensitive element or target upon which the image formed by lens 12 is projected. Electric connection to the light sensitive element is made through the conductive ring 16.

Also shown within the housing 11 is an electric motor 17 the shaft 18 of which is connected to a gear box 19 which provides a speed reduced output at its shaft 21. A pinion 22 fastened to the shaft 21 meshes with the iris adjusting gear 14 so that rotation of the motor 17 opens or closes the iris, depending upon the direction of rotation. The other necessary elements of the television camera have not been shown since they may be of conventional construction.

Referring now to Fig. 2, there is shown the light sensitive pickup tube 15 having a cathode 25 and a signal electrode or target 26 the latter being electrically connected to the external ring 16. The tube 15 may be a so-called "Vidicon" which includes suitable internal electrodes and external coils to form a beam of electrons having suitable velocity and to cause the beam to scan the target 26. These electrodes and coils have been omitted from the drawing because they are of conventional construction and function in the usual well-known manner. The construction of the signal electrode and the formation of the video signal are also well known and will be but briefly discussed. The signal electrode 26 comprises a thin layer of photoconductive material deposited on a transparent conducting film which in turn is on the inner surface of the transparent face plate and is connected to the external conductive ring 16. When an image is formed on one side of the photoconductive layer and the other side is scanned by an electron beam, a small current constituting the video signal output flows in the external circuit connected to the ring 16. The magnitude of the video signal is a function of both the brightness of the image and the D.C. potential of the signal electrode.

The cathode 25 is connected through a resistor 27 to ground and is also coupled through a capacitor 28 to a terminal 29 to which may be connected suitable blanking voltages. The signal electrode 26 is connected through a resistor 31 to a conductor 32 on which appears the proper D.C. biasing voltage, as will be more fully explained. The useful video signal voltage is developed by the current flowing from the electrode 26 through a blocking capacitor 30 and a resistor 33 to ground. The voltage drop across resistor 33 is amplified by a video amplifier 34 the output of which appears between the junction 35 and ground. The voltage of junction 35 is the useful video output and may be connected to the monitor, transmitter, or other apparatus (not shown).

The series combination of a resistor 37 and a potentiometer 38 is connected between the junction 35 and ground, and the voltage used for control purposes in the present invention is that portion of the video output appearing between the slider of potentiometer 38 and ground. This voltage is coupled by a capacitor 39 to the input of the voltage amplifier comprising a triode 41 and its associated circuit, the output being taken from the anode. Another triode 42 is diode connected, having its anode and grid connected together and grounded while its cathode is connected through a resistor 43 to ground. The anode of triode 41 is coupled by means of a capacitor 44 to the junction 45 which is connected to the cathode of triode 42. The triode 42 thus acts as a D.C. restorer so that the video signal at junction 45 is always positive and at a fixed reference level with respect to ground. The junction 45 is connected to a peak detector circuit comprising a crystal diode 46 and a capacitor 47 which tends to develop across capacitor 47 a unidirectional voltage the magnitude of which is indicative of the peak value of the video signal. This tendency is modified by the resistive network comprising serially connected resistors 48 and 49 which connect the junction of diode 46 and capacitor 47 to the grid of a triode 51. A resistor 52 connects the junction of resistor 48 and 49 to a source of negative potential. The latter connection sets the bias of triode 51 and also provides a discharge path for the capacitor 47. The values of the various components are selected so that the capacitor 47 will not be fully charged by a single high peak of short duration but will require either many short duration peaks in rapid succession or a sustained peak to fully charge it. A number of short duration peaks separated by a time interval long compared to the duration of the peak will allow the capacitor 47 to discharge between peaks so that it does not become fully charged. The result is that the potential of the grid of triode 51 at any time represents a weighted average of the peaks occurring during the next preceding interval of time, with the greatest weight being given to the most recent peaks. This potential is an excellent indication of the average brightness of the scene being viewed and is amplified by a direct coupled amplifier comprising the triode 51 and its associated circuitry and the amplified voltage appears at the junction 53. The voltage of junction 53 is led to three separate circuits for purposes to be described.

First, the voltage of junction 53 determines the D.C. potential of the signal electrode 26 of tube 15. Junction 53 is connected to a source of negative potential through the series combination of a potentiometer 54 and a resistor 55 so that the voltage variations of junction 53 can be reproduced on the slider 56 of the potentiometer 54 but at a D.C. level suitable for biasing the signal electrode 26 of tube 15. The slider 56 is connected to the conductor 32 which, as previously explained, is connected through the resistor 31 to the signal electrode 26. In the specific embodiment being described, the parameters of the circuits were selected so that the potential of the signal electrode 26 is normally maintained within the range of 30 to 60 volts.

Second, the junction 53 is connected through a resistor 58 to the grid 59 of a triode 61 so that the potential of junction 53 controls the conductivity of triode 61. When the potential of junction 53 rises to a predetermined value, triode 61 conducts sufficiently to operate a relay 62 the winding 63 of which is in the anode circuit. Operation of the relay 62 closes the two normally open contacts 64 and 65.

Third, the junction 53 is connected through a resistor 67 to the grid 68 of a triode 69 so that the potential of junction 53 controls the conductivity of triode 69. The anode 71 of triode 69 is connected through a resistor 72 to a source of positive potential while the cathode 73 is connected through a resistor 74 to the cathode 75 of a triode 76. Cathode 75 is connected to ground through a resistor 77 while the anode 78 is connected through a resistor 79 to a source of positive potential. The grid 81 is held at a substantially constant potential by connecting it to the junction of resistors 82 and 83 which are serially connected between the source of positive potential and ground. A relay 85 equipped with two normally open contacts 86 and 87 has its operating winding 88 connected between anodes 71 and 78. Normally anodes 71 and 78 are near enough to the same potential so that relay 85 remains unoperated. When the potential of junction 53 falls, the potential of the grid 68 also falls thus causing the potential of anode 71 to rise. The common cathode circuit causes cathode 75 to fall in potential while grid 81 remains constant, thus causing anode 78 to fall. When the potential of junction 53 falls to a predetermined value, winding 88 will close contacts 86 and 87.

The electric motor 17 is shown in Fig. 2 and, it will be recalled, is mechanically connected to the iris control gear 14. Motor 17 is controlled by relays 62 and 85, rotating in such a direction as to open the iris when relay 62 is energized, rotating in the opposite direction so as to close the iris when relay 85 is energized, and remaining stationary when the relays are deenergized as shown in the drawing. The motor 17 may be any of several kinds and is shown for illustrative purposes as being a single phase shaded pole motor having a main winding 91 and two shading windings 92 and 93.

A source of alternating current has one terminal 94 grounded and the other terminal 95 connected through the normally open switches 64 and 86, which are connected in parallel, to the armature of a single pole double throw switch 96 operated by a winding 97. The upper contact of the switch 96, which the armature normally engages as shown in the drawing, is connected to one terminal of the motor winding 91, the other terminal of which is grounded. Switches 65 and 87 are connected in parallel with windings 92 and 93 respectively so that when one of these switches is closed its associated winding is short circuited. Thus it is seen that when relay 62 is operated the motor rotates in one direction while when relay 85 is operated it rotates in the other direction.

One terminal of the winding 97 is grounded while the other terminal is connected to the lower contact of switch 96 and is also connected to one terminal of a normally open switch 98 the other terminal being connected to the alternating current source terminal 95. The switch 98 is operated by a winding 99 which is connected in parallel with the motor winding 91. Winding 99 is a part of a time delay mechanism designed so that the switch 98 will be closed only if the winding 99 remains energized for three minutes.

To describe the operation, let it be assumed that a scene is being televised, the video signal output is normal, and the signal electrode potential is near the middle of its range, or about 45 volts. Next let it be assumed that the camera starts to view a darker scene. This causes a reduction in the magnitude of the video signal at junctions 35 and 45, the grid of tube 51 becomes more negative, the potential of junction 53 becomes more positive, and the potential of the signal electrode 26 is increased, thus tending to restore the video output signal to its former value. The two amplifiers 41 and 51 have high gain so that ordinarily an equilibrium position is soon reached with the signal electrode potential higher and the video signal but slightly reduced. However, if the reduction in brightness of the scene is so great that the potential of signal electrode 26 rises to sixty volts, then the potential of junction 53 and that of grid 59 will be sufficient to increase the current through winding 63 so that the relay 62 is operated and the switches 64 and 65 are closed, thereby energizing motor 17 and opening the iris. As more light reaches the signal electrode 26, the video output signal starts to increase, which increase reduces the D.C. potential of electrode 26. The iris continues to open until the potential of electrode 26 is reduced to about forty-five volts at which point the potential of grid 59 will be reduced sufficiently to cause the relay 62 to drop out, thereby stopping the motor 17.

If the camera is shifted to a more brilliantly illuminated scene a similar but opposite action takes place. The video signal at junctions 35 and 45 starts to increase in magnitude, the potential of the grid of triode 51 increases, and the potential of junction 53 and the signal electrode 26 falls thus tending to reduce the magnitude of the video signal to its former value. Ordinarily an equilibrium is soon reached, but if the scene is so brilliantly illuminated that the potential of the signal electrode 26 falls to thirty volts, the potential of junction 53 will be low enough to cause winding 88 to close contacts 86 and 87 thus starting the motor 17 and closing the iris. The parameters of the circuit are chosen so that the winding 88 holds the contacts 86 and 87 closed until the potential of signal electrode 26 rises to about forty-five volts at which point the contacts open.

Under extreme lighting conditions, such as very low illumination, the iris mechanism may reach its limit of operation whereupon the motor 17 will remain energized but be unable to rotate. There is nothing to prevent the potential of signal electrode 26 from rising above sixty volts thereby obtaining the maximum sensitivity of the tube and operation of the tube outside its nominal range will result in a picture providing useful information although the picture may be degraded in quality. However, extended periods of energization of the motor without rotation would cause a dangerous rise in temperature but are prevented by the relays 97 and 99. When the motor has been energized for three minutes the coil 99 will close the contacts 98 thereby energizing winding 97 and shifting the armature of the switch 96 from the upper to the lower contact. This switching action breaks the circuit to the motor winding 91 and the time delay relay winding 99 and completes an auxiliary circuit for the winding 97 through the lower contact. When normal illumination is restored, the potential of the signal electrode will drop and when it reaches about forty-five volts the relay 62 will drop out thereby opening contacts 64 and 65 which in turn cause relay 97 to drop out, thus restoring the motor circuit to normal operation. It is obvious that a like operation would occur if the light were too brilliant to be reduced sufficiently by the iris.

Thus it is apparent that the present invention provides a system for adjusting a television camera for optimum performance over the full range of light conditions for which the camera is designed. The potential of the signal electrode is normally left within the range of high quality operation but is permitted to assume extreme values when necessary. The iris is adjusted to a value consistent with a reasonable depth of focus except when wide open operation is required. Since moderate variations in light intensity are compensated for solely by adjustment of the voltage of the signal electrode, the iris need be adjusted only occasionally. Thus excessive wearing of the mechanical parts is avoided.

What is claimed is:

1. A control system comprising, an electron tube for generating an electric signal indicative of the spatial variation of the intensity of light incident thereon, said tube including an electrode the potential of which controls the magnitude of said signal, and means responsive to the magnitude of said signal for controlling both the amount of light permitted to fall on said tube and the potential of said electrode.

2. A control system comprising, an electron tube for converting spatial variations of light intensity to time variations of the magnitude of an electric current, said tube including an electrode the potential of which controls the average magnitude of said current, and means responsive to the magnitude of said current for controlling both the amount of light incident upon said tube and the potential of said electrode.

3. A control system comprising, an electron tube including a light sensitive signal electrode for generating an electric current the time variations of which cyclically represent the spatial variations of the intensity of light incident upon said signal electrode, means responsive to the magnitude of said current for controlling the potential of said signal electrode and means responsive to the potential of said signal electrode for controlling the amount of light reaching said signal electrode.

4. A control system comprising, an electron tube including a light sensitive signal electrode for generating an electric current the time variations of which cyclically represent the spatial variations of the intensity of light incident upon said signal electrode, means responsive to the weighted average of the peak magnitude of said current for controlling the potential of said signal electrode, and means operable when the potential of said signal electrode reaches either a first or a second predetermined value for respectively increasing or decreasing the amount of light permitted to reach said signal electrode.

5. A control system comprising, an electron tube for generating a signal indicative of the spatial variations in light intensity of a scene being viewed, said tube including a control electrode, an iris for adjusting the amount of light from said scene which is permitted to reach said tube, means responsive to the intensity of illumination of said scene for controlling the potential of said electrode, means for initiating the opening of said iris when the potential of said electrode rises to the upper limit of a preferred range of potentials and for discontinuing the opening of said iris when said potential falls to a predetermined value within said range, and means for initiating the closing of said iris when the potential of said electrode falls to the lower limit of said range and for discontinuing the closing of said iris when said potential rises to said predetermined value within said range.

6. A control system comprising, an electron tube including a light sensitive signal electrode for generating an electric current the time variations of which repeatedly represent the spatial variations of the intensity of light incident upon said signal electrode, means responsive to the magnitude of said current for controlling the potential of said signal electrode, an iris for adjusting the amount of light reaching said electrode, an electric motor mechanically connected to said iris for opening said iris when rotated in a first direction and for closing said iris when rotated in a second direction, means for energizing said motor to rotate in said first direction when the potential of said signal electrode rises to a first predetermined value and for deenergizing said motor when said potential falls to a second predetermined value, and means for energizing said motor to rotate in said second direction when the potential of said signal electrode falls to a third predetermined value and for deenergizing said motor when said potential rises to said second value, said second value lying between said first and third values.

7. A control system comprising, an electron tube including a light sensitive signal electrode for generating an electric current the time variations of which repeatedly represent the spatial variations of the intensity of light incident upon said signal electrode, means responsive to the weighted average of the peak magnitude of said current for controlling the potential of said signal electrode, an iris for adjusting the amount of light reaching said electrode, an electric motor mechanically connected to said iris for opening said iris when rotated in a first direction and for closing said iris when rotated in a second direction, means for energizing said motor to rotate in said first direction when the potential of said signal electrode rises to a first predetermined value and for deenergizing said motor when said potential falls to a second predetermined value, and means for energizing said motor to rotate in said second direction when the potential of said signal electrode falls to a third predetermined value and for deenergizing said motor when said potential rises to said second value, said second value lying between said first and third values, and means responsive to energization of said motor for a predetermined time for deenergizing said motor and for preventing its reenergization until the potential of said signal electrode has returned approximately to said second value.

References Cited in the file of this patent
UNITED STATES PATENTS

| | | |
|---|---|---|
| 2,396,023 | Schantz | Mar. 5, 1946 |
| 2,655,848 | Gray | Oct. 20, 1953 |